(12) United States Patent
Parkvall et al.

(10) Patent No.: US 8,744,468 B2
(45) Date of Patent: Jun. 3, 2014

(54) SOFT CELL INTER-LAYER INTERFERENCE HANDLING

(75) Inventors: Stefan Parkvall, Stockholm (SE); David Astely, Bromma (SE); Erik Dahlman, Bromma (SE); David Hammarwall, Vallentuna (SE); Bengt Lindoff, Bjärred (SE); Stefano Sorrentino, Solna (SE); Leif Wilhelmsson, Dalby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/640,337

(22) PCT Filed: Jul. 30, 2012

(86) PCT No.: PCT/EP2012/064860
§ 371 (c)(1),
(2), (4) Date: Oct. 10, 2012

(87) PCT Pub. No.: WO2013/170911
PCT Pub. Date: Nov. 21, 2013

(65) Prior Publication Data
US 2013/0310059 A1    Nov. 21, 2013

Related U.S. Application Data

(60) Provisional application No. 61/647,601, filed on May 16, 2012.

(51) Int. Cl.
    *H04W 72/04*    (2009.01)
(52) U.S. Cl.
    USPC .................... 455/452.1; 370/345; 370/350
(58) Field of Classification Search
    CPC .... H04L 1/0026; H04W 48/04; H04W 88/06; H04W 28/04; H04W 56/00
    USPC ........... 455/452.1, 67.13; 370/312, 345, 350, 370/328
    See application file for complete search history.

(56) References Cited

U.S. PATENT DOCUMENTS

| 2009/0131065 A1* | 5/2009 | Khandekar et al. ........ 455/452.1 |
| 2009/0252075 A1 | 10/2009 | Ji et al. |
| 2011/0170496 A1 | 7/2011 | Fong et al. |
| 2011/0312319 A1 | 12/2011 | Lindoff et al. |

FOREIGN PATENT DOCUMENTS

WO    2012108806 A1    8/2012

OTHER PUBLICATIONS

3rd Generation Partnership Project. "Considerations on Interference Coordination in Het-Net." 3GPP TSG RAN WG1 meeting #60, R1-100902, Feb. 22-26, 2010, pp. 1-5, San Francisco, USA.

(Continued)

*Primary Examiner* — Phuoc H Doan
(74) *Attorney, Agent, or Firm* — Murphy, Bilak & Homiller, PLLC (57) ABSTRACT

In a heterogeneous cell deployment a mobile terminal may need to receive control data transmissions from a macro node at the same time as a pico node is transmitting user data for the mobile terminal, using the same frequency or set of frequencies. This can result in a problematic interference situation. According to several embodiments of the present invention, at least one of two general approaches is used to mitigate the interference situation described above. In a first approach, the pico node's transmission power is reduced in some time intervals, thereby reducing the interference to a level where reception from the macro node is possible. In a second approach, which may be combined with the first approach in some cases, the data transmitted from the macro node is provided by the pico node, either alone or in combination with the macro node.

28 Claims, 6 Drawing Sheets

OTHER PUBLICATIONS

3rd Generation Partnership Project. "LTE non-CA based HetNet support." 3GPP TSG RAN WG1 meeting #60bis, R1-101982, Apr. 12-16, 2010, pp. 1-7, Beijing, China.

3rd Generation Partnership Project. "Methods to facilitate the inter-cell coordination in heterogeneous networks." 3GPP TSG RAN WG1 Meeting #61, R1-102705, May 10-14, 2010, pp. 1-3, Montreal, Canada.

3rd Generation Partnership Project. "Text proposal on LTE TDD HeNB interference control." 3GPP TSG-RAN WG4 #AdHoc1, R4-100178, Jan. 18-22, 2010, pp. 1-21, Sophia Antipolis, France.

* cited by examiner

SOFT CELL INTER-LAYER INTERFERENCE HANDLING

BACKGROUND

The present invention generally relates to wireless communications networks, and more particularly relates to techniques for reducing interference in heterogeneous cell deployments where transmission nodes have different transmission powers and overlapping coverage areas.

Figure 1:
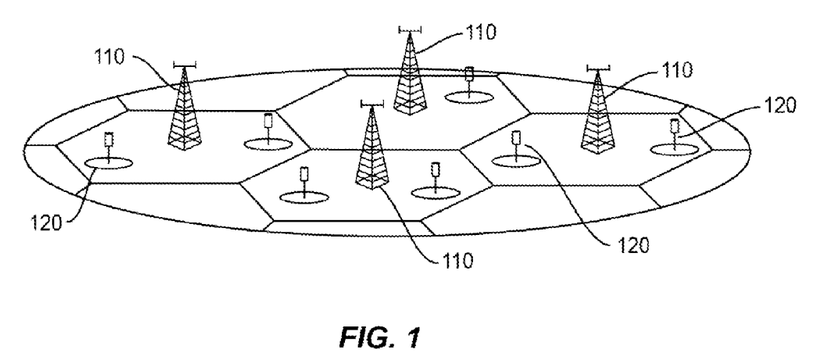
FIG. 1 illustrates an example of a heterogeneous cell deployment.

An interesting deployment strategy for cellular networks is the use of a so-called heterogeneous deployment or heterogeneous network. A heterogeneous network consists of several network transmission nodes having different transmit powers and operating with overlapping coverage areas. FIG. 1 illustrates an example of one such deployment, where macro nodes 110 each provide traditional cellular coverage over a wide area while pico nodes 120 provide "spot" coverage at various places within the macro coverage area.

In such a deployment, the low-power nodes ("pico nodes") are often deployed to offer high data rates (e.g., Megabits/second), as well as high capacity (e.g., in terms of users/$meter^2$ or Megabits/second/$meter^2$), in the local areas where high capacity and/or high-data rates are needed or desired. The high-power nodes ("macro nodes") provide full-area coverage. In practice, the macro nodes may often correspond to currently deployed macro cells while the pico nodes are later deployed nodes, extending the capacity and/or achievable data rates within the macro-cell coverage area where needed.

Transmissions to a mobile terminal (a user equipment, or "UE," in 3GPP terminology) are often divided into control plane and user plane transmissions. Examples of control plane signaling include radio-resource control messages used for mobility and system information necessary for the terminal to access the network. The user plane, on the other hand, refers to transmissions of the actual data for the end user or end application.

A pico node in some heterogeneous deployments may correspond to a cell of its own (a "pico cell"). This means that the pico node has its own identity, and a corresponding cell identifier, and transmits the full set of common signals/channels associated with a cell, in addition to performing downlink and uplink data transmission/reception. In an LTE context, these associated signals and channels include the primary and secondary synchronization signals, cell-specific reference signals, and system information related to the cell. Thus, both the user plane and control plane information are handled by a single pico node.

In a different approach, a pico node does not correspond to a cell of its own, but is instead used primarily for user-plane transmission. In this type of deployment, a mobile terminal served by the pico node relies on the macro layer for at least parts of the control plane signaling. This latter approach has several benefits, such as improved mobility robustness and improved energy efficiency. Since the macro layer is responsible for providing parts of the control-plane information, e.g., by broadcasting system information, the pico node only needs to be active when actually transmitting user data to the terminal. This can lead to significant gains in energy efficiency and an overall reduction in interference, since the pico nodes can be silent in periods of no data transmission activity.

Figure 2A:
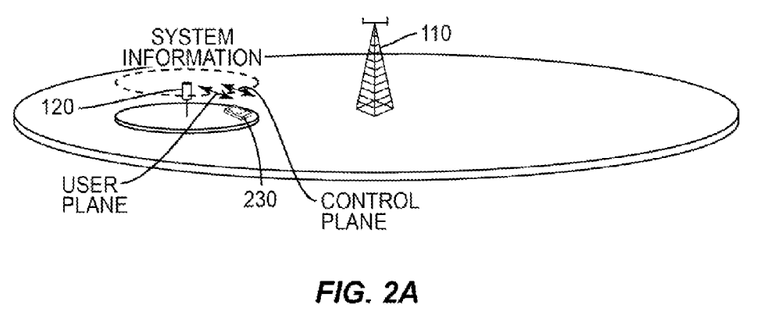
FIGS. 2A and 2B illustrate example allocations of control plane and user plane transmissions to a macro node and a pico node, respectively.
Figure 2B:
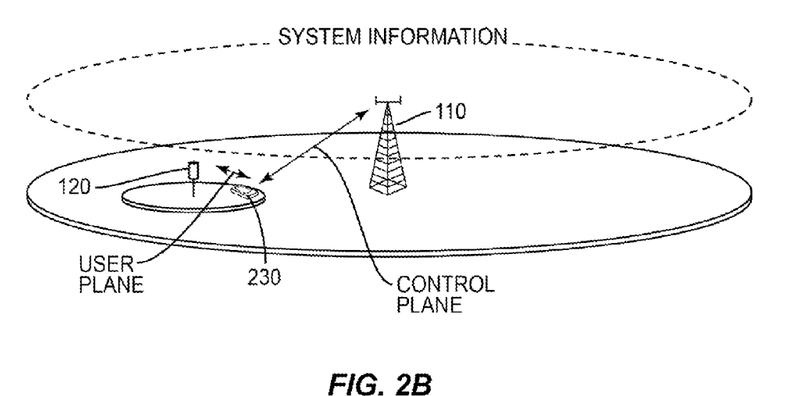

The two general approaches described above are illustrated in FIGS. 2A and 2B. FIG. 2A illustrates a scenario in which the user plane and control plane for a given mobile terminal 230 are both terminated at a single node, in this case at the pico node 120. In FIG. 2B, mobile terminal 230 instead exchanges control plane information with macro node 110, while exchanging user plane data with pico node 120.

Of course, the control and user planes could easily be further subdivided between the macro and pico nodes in different ways. For example, transmission of control and user data could be split according to different sets/types of information, such as by transmitting critical control plane signaling and high-quality user plane transmissions (voice call) from the macro node on an "anchor carrier" and less critical control signaling and/or user data from the pico node on a "booster carrier". In this scenario, the anchor carrier would provide basic connectivity and handle mobility while the booster carrier, when present, would boost the data rates for the terminal. This approach may be generalized to more than two sets of information and more than two sets of nodes.

SUMMARY

In some situations a mobile terminal needs to receive transmissions from an anchor carrier (e.g., control plane signaling) transmitted from a macro node at the same time as a pico node is transmitting a booster carrier (e.g., user data), using the same frequency or set of frequencies. This can result in a problematic interference situation. Although the pico transmission power is lower than the macro transmission power, there will be an area around the pico node where the pico signal is substantially stronger than the macro signal. In essence the pico node creates a "hole" in the macro coverage.

According to several embodiments of the present invention, at least one of two general approaches is used to mitigate the interference situation described above. In a first approach, the pico node's transmission power is reduced in some time intervals, thereby reducing the interference to a level where reception from the macro node is possible. In a second approach, which may be combined with the first approach in some cases, the data transmitted from the macro node is provided by the pico node, either alone or in combination with the macro node.

Embodiments of the invention include several methods according to one or both of these approaches. For instance, one example method, implemented in a first transmitting node having a coverage area falling at least partly within the coverage area of a second transmitting node, begins with determining one or more protected transmission time intervals during which transmissions from the second transmitting node are to be protected. The first transmitting node then transmits at a first power level during one or more transmission time intervals other than the protected transmission time intervals, and transmits at a reduced power level during the one or more protected transmission time intervals.

The one or more protected transmission time intervals can be determined by receiving scheduling information from the second transmitting node, in some embodiments. For example, the first transmitting node may receive a scheduling message that defines a plurality of discontinuous protected transmission time intervals, or it may receive a plurality of scheduling messages, each of the plurality of scheduling messages corresponding to a single protected transmission time interval following the scheduling message. In some of these latter embodiments, each protected transmission time interval follows the corresponding scheduling message by a predetermined interval. In other cases, the first transmitting node receives a scheduling message that specifies a time and at least one of the protected transmission time intervals follows the scheduling message by an interval based on the specified time. In other variants of the method described above, the one or more protected transmission time intervals are determined by identifying the one or more protected transmission time intervals according to a rule stored in the first transmitting node.

In some embodiments, the first transmitting node, in advance of transmitting at a reduced power level during the one or more protected transmission time intervals, transmits control data to mobile terminals, the control data identifying the one or more protected transmission time intervals. In some of these and in some other embodiments, the first transmitting node first determines whether one or more mobile terminals are likely within a predetermined range of the first transmitting node, and only transmits at a reduced power level during the one or more protected transmission time intervals in response to determining that at least one mobile terminal is likely within the predetermined range. In other embodiments, the first transmitting node first determines whether one or more mobile terminals are likely within a predetermined range of the first transmitting node, and then controls the magnitude of the reduced power level depending on whether at least one mobile terminal is likely within the predetermined range. In still other embodiments, the first transmitting node first determines whether the transmission of data specific to the first transmission node is scheduled during the one or more protected transmission time intervals, and then only transmits at a reduced power level during the one or more protected transmission time intervals in response to determining that the transmission of data specific to the first transmission node is scheduled. In any of the above embodiments, the protected transmission time intervals may be selected to coincide with control data transmissions from the second transmitting node.

An example method according to the second general approach discussed above is also implemented in a first transmitting node having a coverage area falling at least partly within the coverage area of a second transmitting node. This example method also begins with the determining of one or more protected transmission time intervals during which transmissions from the second transmitting node are to be protected. The determining of which intervals are to be protected by this assisted transmission can be performed according to any of the techniques summarized earlier.

However, this method continues with the transmitting of first-node-specific data to one or more mobile terminals at a first power level during one or more transmission time intervals other than the protected transmission time intervals and, during the one or more protected transmission time intervals, the transmitting of second data that is also transmitted by the second transmitting node during the protected transmission time intervals. In some embodiments of this method, the transmitting of this second data is performed simultaneously with corresponding transmissions from the second transmitting node, using the same transmission format as the second transmitting node. In some cases, the transmitting of the second data is performed at a reduced power level, relative to the first power level, and it may be accompanied by transmission of UE-specific demodulation reference symbols by the first transmitting node.

In some of these embodiments, the first transmitting node also transmits synchronization signals or reference signals or both, wherein the synchronization signals or reference signals or both correspond to a cell identifier specific to the first transmitting node. Whether or not the transmitting of the second data is performed at a reduced power level, the synchronization signals or reference signals or both may be transmitted at a reduced power level, relative to the first power level, in some embodiments. The transmitting of second data during the one or more protected transmission time intervals may comprise ramping up a transmit power level during each transmission of the second data, from a reduced power level, in some embodiments.

Transmitting apparatus adapted to carry out any of the techniques summarized above, and variants thereof, are also disclosed in the detailed discussion that follows. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

Note that although terminology from 3GPP LTE has been used in this disclosure to exemplify the invention, this should not be seen as limiting the scope of the invention to only the aforementioned system. Other wireless systems, including WCDMA, WiMax, UMB and GSM, may also benefit from exploiting the ideas covered within this disclosure. Also, while the terms "pico node" and "macro node" are used extensively in the discussion that follows, it should be appreciated that the techniques are applicable to any of a variety of transmitting nodes where the coverage area of one transmitting node falls at least partly within the coverage area of another, including deployments in which the coverage area of one node falls entirely with the coverage of another, such as might be found in a "hot-spot" scenario. Thus, the terms pico node and macro node as used herein should be understood to represent examples; the use of these terms is not meant to rule out the applicability of these techniques to other nodes and other radio base stations, whether those nodes are called femtocells, picocells, microcells, femto nodes, micro nodes, or the like.

In some situations a mobile terminal needs to receive transmissions from an anchor carrier (e.g., control plane signaling) transmitted from a macro node at the same time as the pico node is transmitting the booster carrier (e.g., user data) on the same frequency (or set of frequencies). This can result in a problematic interference situation. Although the pico node's transmission power is generally lower than the macro node's transmission power, there will be an area around the pico node where the pico signal is substantially stronger than the macro signal.

Figure 3:
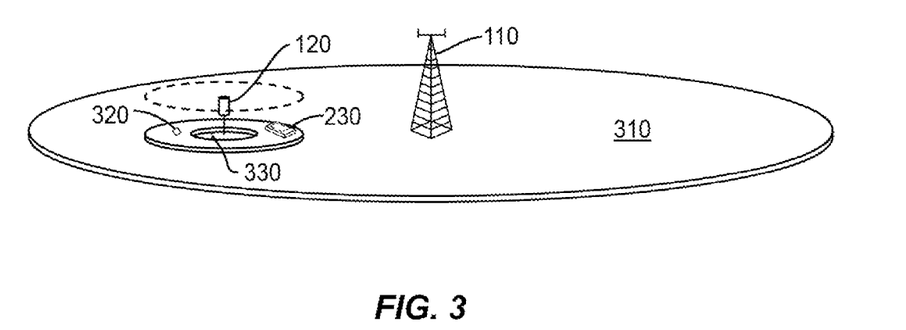
FIG. 3 illustrates a "hole" in macro node coverage caused by pico node transmissions.

This can be seen in FIG. 3, which illustrates three regions. A first region 310 includes the coverage area of macro node 110 that is unaffected by transmissions from the pico node 120, because of the pico node's relatively low power. In this area, reception of signaling from the macro terminal is not impaired by pico node transmissions. In a second region 320, transmissions from the pico node 120 can be detected by the mobile terminal 230, but the transmissions in this "medium-power" area are not so strong as to overwhelm transmissions from macro node 110. Accordingly, it is possible for mobile terminal 230 to receive signaling from the macro node 110 in this region. In region 330, however, transmissions from the pico node 120 are received at substantially higher levels than those from macro node 110. In this region, it is not possible for the mobile terminal 230 to receive signaling from macro node 110.

As seen in FIG. 3, transmissions from a pico node can effectively create a "hole" in the signal coverage from the macro node. This is particularly a problem when the macro and pico nodes operate in the same frequency band or even on the same frequencies. However, even if the macro and pico transmissions are separated in the frequency domain, reception from the macro node may still be problematic due to the very large dynamic range required to handle the strong interference from the pico node in the innermost part of the area covered by the pico node.

According to several embodiments of the present invention, at least one of two general approaches is used to mitigate the interference situation described above. In a first approach, the pico node's transmission power is reduced in some time intervals, thereby reducing the interference to a level where reception from the macro node is possible. In a second approach, which may be combined with the first approach in some cases, the data transmitted from the macro node is provided by the pico node, either alone or in combination with the macro node.

Figure 4:
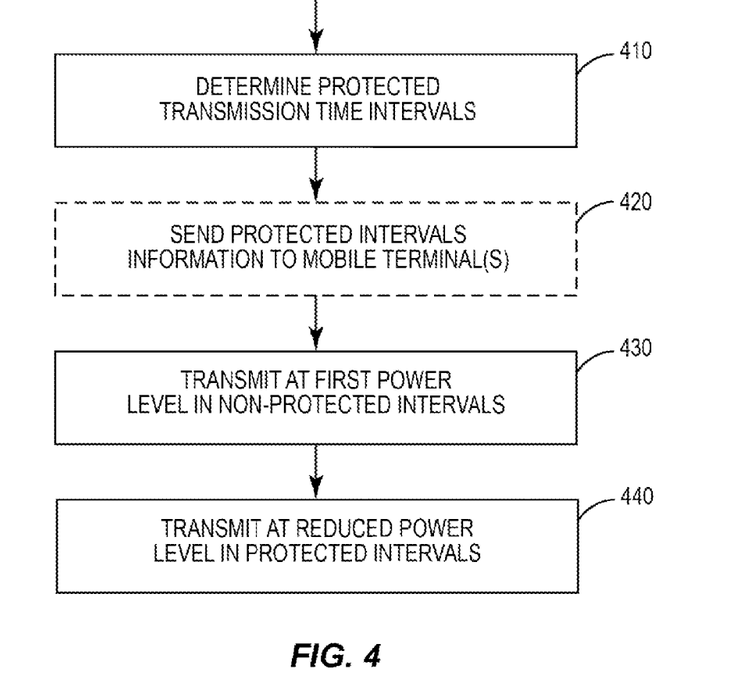
FIG. 4 is a process flow diagram illustrating an example method according to some embodiments of the present invention.

FIG. 4 is a process flow diagram illustrating an example of the first approach. The illustrated process is carried out by a transmitting node, such as a pico node, that has a coverage area that falls at least partly within the coverage area of a second transmitting node. As shown at block 410, the transmitting node first determines one or more protected transmission time intervals during which transmissions from the other transmitting node are to be protected. These intervals might correspond to intervals in which control plane signaling is transmitted from a macro node, for example. As will be discussed in more detail below, these intervals might be determined by any of several techniques, such as by consulting a pre-defined rule defined by standards and stored in the pico node, or by receiving control signal scheduling information from a macro node.

In some embodiments, control data identifying the protected transmission time intervals is transmitted to one or more mobile terminals served by the transmitting node, as shown at block 420. This may be unnecessary in some embodiments, as these techniques may be implemented in a way that is "transparent" to the mobile terminals. For that reason, block 420 is rendered with dashed lines, indicating that this operation may be omitted in some embodiments.

As shown at block 430, the transmitting node transmits information to mobile terminals at a first, "normal," power level in time intervals other than the protected transmission time intervals. As shown at block 440, the transmitting node reduces its transmission power in the protected transmission time intervals, so that the transmissions are at a reduced power compared to the first power level. This results in lower interference at mobile terminals in the proximity of the transmitting node, enabling these terminals to receive transmissions from the macro node during the protected transmission time intervals. With this approach, a pico node can "protect" certain time intervals so that a macro node can exploit them to contact a terminal close to the pico node. These protected transmission time intervals can be as short as single subframe, in some embodiments, or may span several subframes in others.

Coordination of some sort between the protecting and protected transmitting nodes is required to ensure that the power reductions at the protecting node coincide with (potential) transmissions from the protected node. One approach to this coordination is through standardization. With this approach, system specifications list or otherwise define rules specifying exactly the protected transmission time intervals, e.g., those subframes during which a pico node should reduce its transmission activity. In essence, the transmitting nodes have agreed in advance which transmission time intervals should be protected; a list or rules defining these protected transmission time intervals may be stored in both transmitting nodes at the time of manufacture or deployment, or during configuration of the transmitting nodes. It will be appreciated, of course, that standardization is not strictly necessary: similar lists or rules may be developed by an operator, for example, and stored in transmitting nodes by any number of configuration techniques.

Another approach is to introduce signaling between the transmitting nodes to carry scheduling information defining the protected transmission time intervals. This signaling can be semi-static, where a scheduling message defines several separate (i.e., discontinuous) protected transmission time intervals in advance, or dynamic, where the protected node (e.g., a macro node) notifies a protecting node (e.g., a pico node), a relatively short time in advance, that the pico node should reduce its transmission activity for a particular interval following the scheduling message. In some cases, that particular interval may be statically defined, e.g., to occur a pre-defined number of subframes after the scheduling message is received. In others the protected transmission time interval is specified by the scheduling message itself. For instance, in some of these embodiments the scheduling message specifies a time, and at least one protected transmission time interval follows the scheduling message by an interval that is based on the specified time.

In some embodiments according to the preceding approach, a "grid" of protected subframes is configured or specified to overlap with all, or a subset of, the possible paging subframes that occur periodically in paging cycles. Such a configuration has the advantage that terminals in DRX (idle mode) generally perform all measurements and control plane-related decoding in such subframes. Hence any terminal in idle mode, whose presence and radio conditions are particularly difficult to track for a network, can operate and receive from a macro node robustly. As noted earlier, information about protected subframes can also be provided to the terminal to adjust one or more parameters, for example automatic gain control (AGC), in order to aid the reception of transmissions from the higher power transmitting node.

Figure 5:
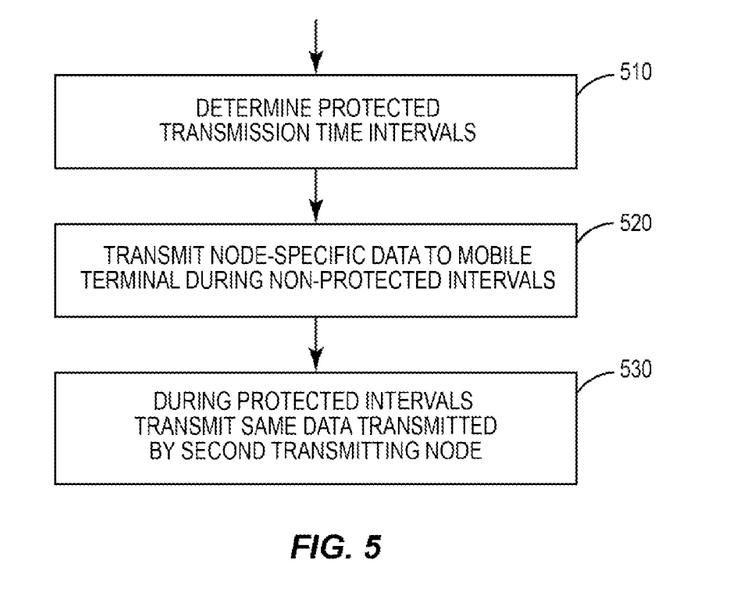
FIG. 5 is a process flow diagram illustrating another example method according to some embodiments of the present invention.

The process flow diagram of FIG. 5 illustrates one example of a second approach to mitigating the interference problem discussed above. In this approach, a transmitting node (such as pico node) with a coverage area falling at least partly within the coverage area of another node (such as a macro node) assists in providing information (such as control information) that would otherwise be transmitted from the other node alone.

As shown in block 510, the transmitting node first determines one or more protected transmission time intervals during which transmissions from the second transmitting node are to be protected. This may be done in any of the ways discussed above. As shown at block 520, the illustrated method continues with the transmitting of node-specific data, at a first power level, during intervals other than the protected transmission time intervals. Then, as shown at block 530, the transmitting node "assists" the second transmitting node during the protected transmission intervals, by transmitting second data that is also transmitted by the second transmitting node during the protected transmission time intervals.

Generally, the "assistance" approach described here is transparent to the terminal, so there is no need to inform the targeted mobile terminal or terminals of the protected transmission time intervals. This will be the case, for example, if the assisting/protecting node transmits the relevant information simultaneously with the assisted/protected node and using the same signal structure. Such a transmission of the same signal from multiple nodes is often referred to as single frequency network (SFN) operation. Note that in such a case reference signals used to support reception and demodulation at the terminal, i.e., reference signals, should also be transmitted from the assisting node, so that the receiving mobile terminal can properly characterize the complex transmission channel experienced by the simultaneously transmitted information signals.

Non-transparent pico assistance, where the terminal is informed of the protected transmission time intervals and that information is coming from the pico node and not the macro node, is also possible. However, with such an approach some of the benefits of the soft cell approach, such as mobility robustness, will be lost.

It should also be appreciated that a pico node (or other type of assisting transmitting node) may transmit the relevant information using SFN operation, but with reduced power relative to the pico's nominal transmission power. For example, a pico node's SFN transmission could be transmitted at a substantially reduced power such that the SFN transmission's coverage area does not substantially exceed the macro coverage hole around the pico node, which is generally much smaller than the pico node's normal coverage area. This approach will ensure that a mobile terminal is able to maintain synchronization and receive system information even when it is very close to the pico node; that is, even when it is in the macro coverage hole.

With this approach, mobile terminals that support Release 11 of the 3GPP standards for LTE may then receive control/scheduling information and data transmission from the pico node based on transmissions using UE-specific demodulation reference symbols, e.g., using transmission mode 9 (TM9) and an enhanced Physical Downlink Control Channel (ePDCCH). A legacy terminal, e.g., a mobile terminal not capable of decoding an ePDCCH, may experience reduced performance at the region where the SFN transmission from the pico and the transmission from the macro are received with a similar power. In this region, decoding of signals transmitted only from the pico node (or only from the macro node) and based on Common Reference Symbols (CRS) will suffer from a mismatch of the estimated channel, since the channel estimates will be based on CRS that are received with similar powers from both the pico node and the macro node, while the channel experienced by the decoded transmission may be from the pico node only (or the macro node only).

In yet another variant of these approaches a pico node may superimpose a pico cell of its own on the SFN transmissions discussed above. That is, the pico node may at least temporarily form a pico cell of its own by transmitting Primary Synchronization Signals (PSS), Secondary Synchronization Signals (SSS), and CRS, all corresponding to a cell ID that is specific to the pico node. This superimposed pico cell may be transmitted at a transmission power that is substantially reduced relative the pico's nominal transmission power. For instance, the superimposed pico cell transmission power could be substantially reduced so that the coverage area does not substantially exceed the coverage hole, in the same manner as discussed above for the SFN transmission of the macro cell-related information. This approach provides robustness to legacy terminals in the problematic region where the pico node SFN transmission and the macro transmission are received with similar power. In this region, the legacy terminals can be instructed with a handover command to attach to the pico cell, and hence continue to receive data and control robustly. It should be noted also that to some extent the transmissions of the superimposed pico cell and other transmissions from the pico node (including the SFN transmission) can be scheduled, or planned, to be orthogonal, thereby increasing the SINR of the superimposed cell. However, there could be reasons why the superimposed cell would be planned such that the cell specific reference signals and synchronizations signals between the pico and the macro cells are maximally overlapping. This will result in an signal-to-interference-plus-noise ratio (SINR) on these signals on the order of zero dB, but still well within the robust operating point of an LTE system. In such a configuration, the performance of the "fall-back" pico cell will be reduced, but the interference caused on the data channel and ePDCCH transmission to terminals attached to the macro cell is minimized.

Figure 6:
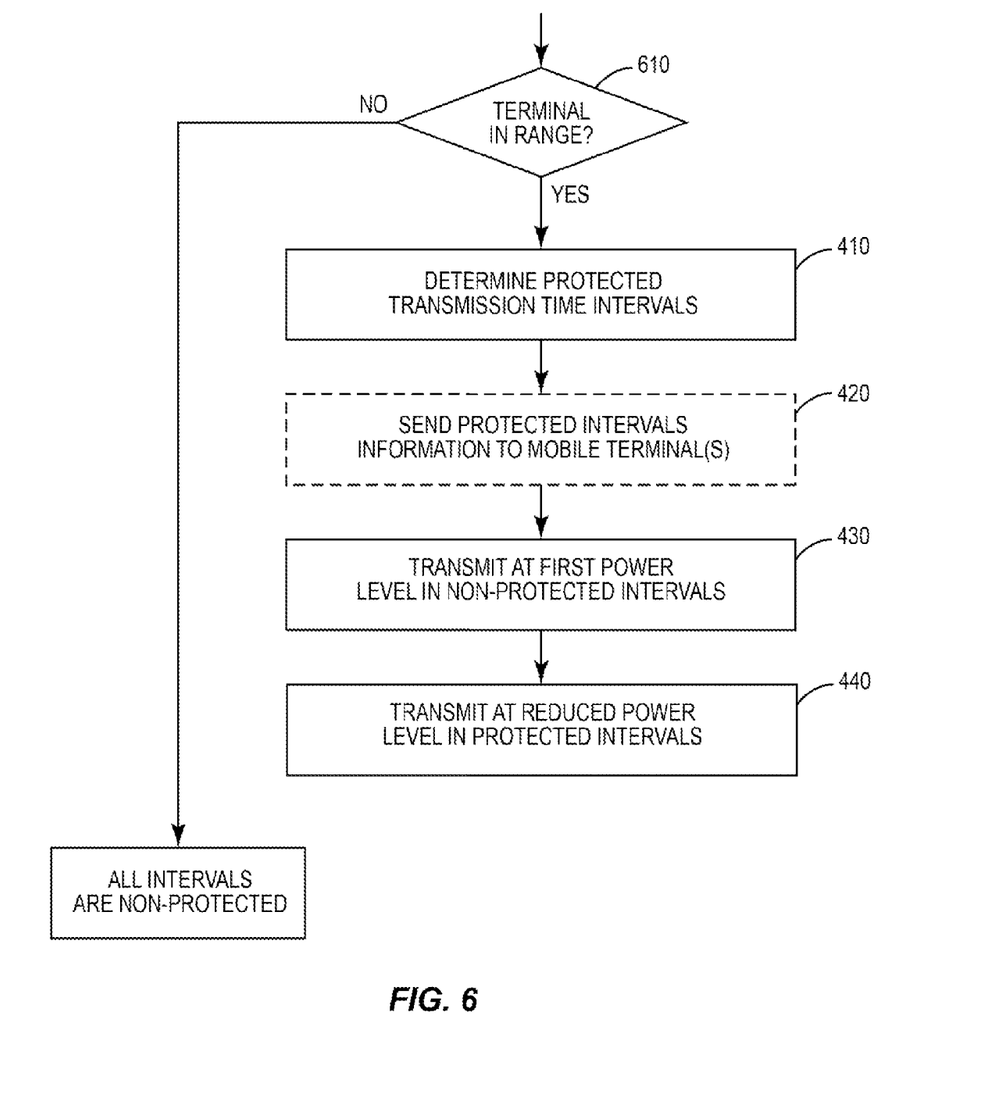
FIG. 6 illustrates a variant of the process flow of FIG. 4.
Figure 7:
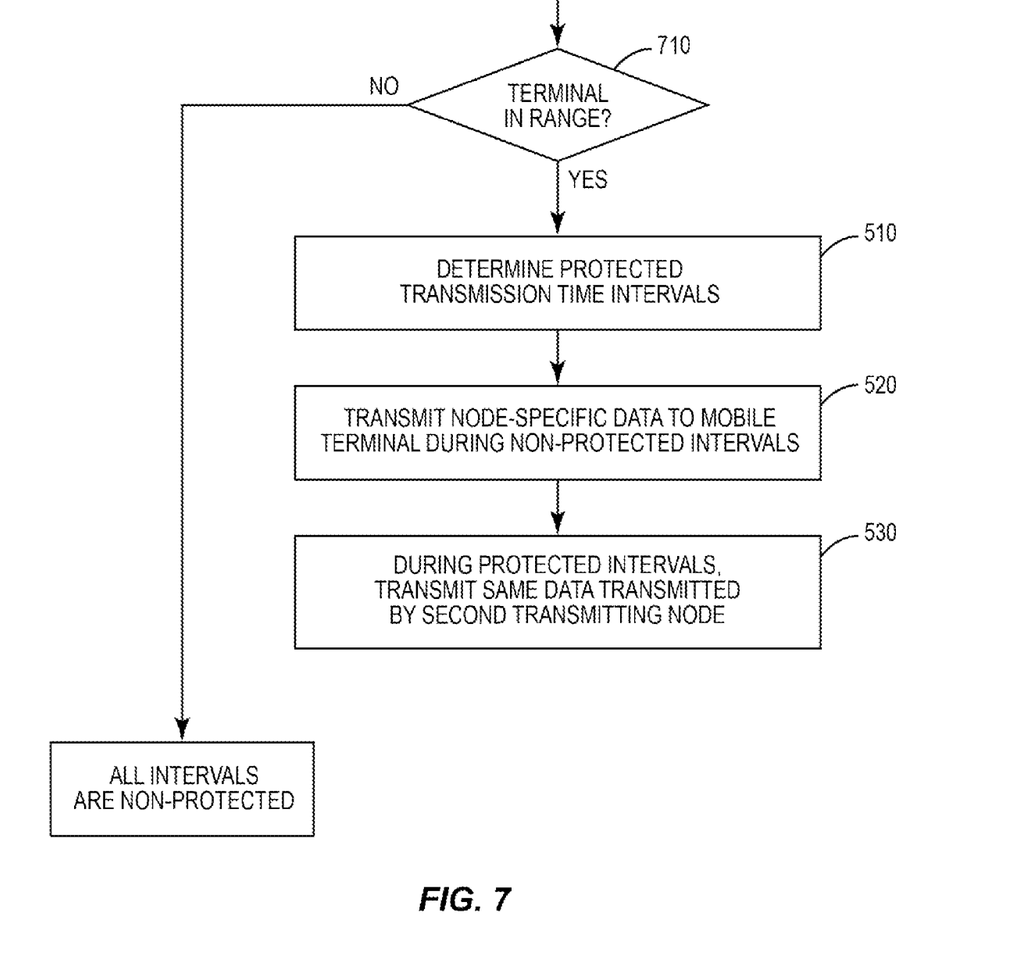
FIG. 7 illustrates a variant of the process flow of FIG. 5.

It will be appreciated that in all of the approaches described above, protecting the macro node transmissions by an appropriate pico node behavior (e.g., reduced power and/or assisted transmission) is only necessary when there is a mobile terminal close to the pico node. If the network knows whether there is a terminal close to the pico node, the network can adaptively activate and deactivate the techniques described above as needed. This is illustrated in FIGS. 6 and 7, which correspond closely to the process flows of FIGS. 4 and 5, respectively, except that the protection/assistance operations are selectively employed depending on whether a mobile terminal of interest is within a predetermined range of the transmitting node. This is shown at block 610 in FIG. 6 and block 710 in FIG. 7.

In still another variant, which can be combined with any of the techniques described above, the transmitting node can also take its own transmission activity into account when determining whether protection/assistance is needed, since protecting macro transmissions is necessary only when the pico node would otherwise be doing pico-specific transmissions to one or more mobile terminals. In case of transparent pico node assistance (e.g., the SFN transmission technique discussed above) the activation and deactivation of the assistance can be performed in a gradual way in some embodiments, e.g., by ramping up/down the power of the pico SFN transmission over several subframes in order to avoid negative interactions of the pico node transmissions with functions such as channel estimation, in mobile terminals trying to receive macro transmissions.

Several of the techniques described above can be implemented in connection with a wireless base station, such as a picocell or pico node configured according to Release 11 specifications for LTE. In general, a base station communicates with access terminals and is referred to in various contexts as an access point, Node B, Evolved Node B (eNodeB or eNB) or some other terminology. Although the various base stations discussed herein are generally described and illustrated as though each base station is a single physical entity, those skilled in the art will recognize that various physical configurations are possible, including those in which the functional aspects discussed here are split between two physically separated units. Thus, the term "base station" is used herein to refer to a collection of functional elements (one of which is a radio transceiver that communicates wirelessly with one or more mobile stations), which may or may not be implemented as a single physical unit.

Figure 8:
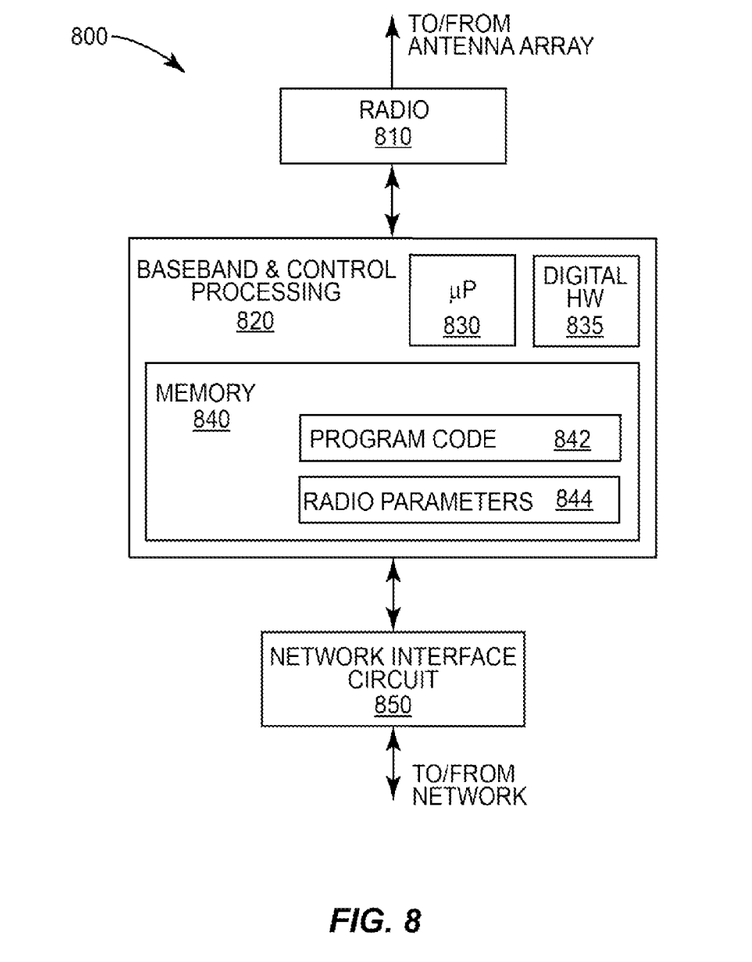
FIG. 8 is a block diagram illustrating several components of an example transmitting apparatus.

FIG. 8 is a block diagram illustrating some components of a transmitting apparatus 800, illustrating a few of the components relevant to the present techniques. The pictured apparatus includes radio unit 810 and baseband & control processing circuit 820. Radio unit 810 includes receiver circuits and transmitter circuits that use known radio processing and signal processing components and techniques, typically according to a particular telecommunications standard such as the 3GPP standard for LTE and/or LTE-Advanced. Because the various details and engineering trade-offs associated with the design and implementation of such circuitry are well known and are unnecessary to a full understanding of the invention, additional details are not shown here.

Baseband & control processing circuit 820 includes one or more microprocessors or microcontrollers 830, as well as other digital hardware 835, which may include digital signal processors (DSPs), special-purpose digital logic, and the like. Either or both of microprocessor(s) 830 and digital hardware may be configured to execute program code 842 stored in memory 840, along with radio parameters 844. Again, because the various details and engineering tradeoffs associated with the design of baseband processing circuitry for mobile devices and wireless base stations are well known and are unnecessary to a full understanding of the invention, additional details are not shown here.

Transmitting apparatus 800 further includes a network interface circuit 850, which is configured for communication with other nodes in the wireless network. In nodes configured for use in an LTE network in particular, this network interface circuit is configured to communicate with other nodes using the X2 interface defined by 3GPP specifications, as well as with one or more Mobility Management Entities (MMES) using 3GPP's S1 interface. Positioning data for mobile terminals may be requested and received via this network interface circuit, using well known techniques such as 3GPP's LPP.

The program code 842 stored in memory circuit 840, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the techniques described herein, in several embodiments. Radio parameters 844 include various pre-determined configuration parameters as well as parameters determined from system measurements, such as channel measurements, and may include, for example, information defining predefined protected transmission time intervals, or rules for determining these time intervals, and the like.

Accordingly, in various embodiments of the invention, processing circuits, such as the baseband & control processing circuits 820 of FIG. 8, are configured to carry out one or more of the techniques described above for reducing interference in a heterogeneous network deployment. More particularly, the baseband & control processing circuits 820 are configured in some embodiments to act as a radio control unit that determines one or more protected transmission time intervals during which transmissions from the second transmitting node are to be protected, controls the radio unit to transmit at a first power level during one or more transmission time intervals other than the protected transmission time intervals, and controls the radio unit to transmit at a reduced power level during the one or more protected transmission time intervals. In some other embodiments, the baseband & control processing circuits 820 are configured to act as a radio control unit that determines one or more protected transmission time intervals during which transmissions from the second transmitting node are to be protected, controls the radio unit to transmit first-node-specific data to one or more mobile terminals at a first power level during one or more transmission time intervals other than the protected transmission time intervals, and, during the one or more protected transmission time intervals, controls the radio unit to transmit second data that is also transmitted by the second transmitting node during the protected transmission time intervals. Any one or more of the several variants of this interference reducing technique described above may be implemented by this radio control unit, in various embodiments.

In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

Several embodiments of the present invention provide robust solutions for reducing interference in a range of scenarios. Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation. The present embodiments are thus to be considered in all respects as illustrative and not restrictive.

What is claimed is:

1. A method, in a first transmitting node having a coverage area falling at least partly within the coverage area of a second transmitting node, for reducing interference, the method comprising:
   determining one or more protected transmission time intervals during which transmissions from the second transmitting node are to be protected;
   transmitting first-node-specific data to one or more mobile terminals at a first power level during one or more transmission time intervals other than the protected transmission time intervals; and,
   during the one or more protected transmission time intervals, transmitting second data that is also transmitted by the second transmitting node during the protected transmission time intervals.

2. The method of claim 1, wherein said transmitting of second data comprises transmitting said second data simultaneously with corresponding transmissions from the second transmitting node, using the same transmission format as the second transmitting node.

3. The method of claim 2, wherein said transmitting of second data is performed at a reduced power level, relative to the first power level.

4. The method of claim 3, wherein said transmitting of second data is accompanied by transmission of UE-specific demodulation reference symbols by the first transmitting node.

5. The method of claim 2, further comprising transmitting synchronization signals or reference signals or both, wherein said synchronization signals or reference signals or both correspond to a cell identifier specific to the first transmitting node.

6. The method of claim 5, wherein said transmitting of synchronization signals or reference signals or both is performed at a reduced power level, relative to the first power level.

7. The method of claim 1, wherein said determining one or more protected transmission time intervals comprises receiving scheduling information from the second transmitting node.

8. The method of claim 7, wherein receiving said scheduling information comprises receiving a scheduling message that defines a plurality of discontinuous protected transmission time intervals.

9. The method of claim 7, wherein receiving said scheduling information comprises receiving a plurality of scheduling messages, each of the plurality of scheduling messages corresponding to a single protected transmission time interval following the scheduling message.

10. The method of claim 9, wherein each protected transmission time interval follows the corresponding scheduling message by a predetermined interval.

11. The method of claim 1, wherein said determining one or more protected transmission time intervals comprises identifying the one or more protected transmission time intervals according to a rule stored in the first transmitting node.

12. The method of claim 1, further comprising first determining whether one or more mobile terminals are likely within a predetermined range of the first transmitting node, wherein said transmitting of second data during the one or more protected transmission time intervals is performed in response to determining that at least one mobile terminal is likely within the predetermined range.

13. The method of claim 1, wherein said transmitting of second data during the one or more protected transmission time intervals comprises ramping up a transmit power level during each transmission of the second data, from a reduced power level.

14. The method of claim 1, wherein the protected transmission time intervals are selected to coincide with control data transmissions from the second transmitting node.

15. A transmitting apparatus for use in a first transmitting node, wherein said first transmitting node has a coverage that falls at least partly within the coverage area of a second transmitting node, the transmitting apparatus comprising:
a radio unit adapted for data transmissions at a plurality of power levels; and
a radio control unit adapted to:
determine one or more protected transmission time intervals during which transmissions from the second transmitting node are to be protected;
control the radio unit to transmit node-specific data to one or more mobile terminals at a first power level during one or more transmission time intervals other than the protected transmission time intervals; and,
during the one or more protected transmission time intervals, control the radio unit to transmit second data that is also transmitted by the second transmitting node during the protected transmission time intervals.

16. The transmitting apparatus of claim 15, wherein the radio control unit is adapted to control the radio unit to transmit said second data simultaneously with corresponding transmissions from the second transmitting node, using the same transmission format as the second transmitting node.

17. The transmitting apparatus of claim 16, wherein the radio control unit is adapted to control the radio unit to transmit said second data at a reduced power level, relative to the first power level.

18. The transmitting apparatus of claim 17, wherein the radio control unit is adapted to control the radio unit to transmit said second data accompanied by transmission of UE-specific demodulation reference symbols.

19. The transmitting apparatus of claim 16, wherein the radio control unit is further adapted to control the radio unit to transmit synchronization signals or reference signals or both, wherein said synchronization signals or reference signals or both correspond to a cell identifier specific to the first transmitting node.

20. The transmitting apparatus of claim 19, wherein the radio control unit is adapted to control the radio unit to transmit synchronization signals or reference signals, or both, at a reduced power level, relative to the first power level.

21. The transmitting apparatus of claim 15, wherein the radio control unit is adapted to determine the one or more protected transmission time intervals by receiving scheduling information from the second transmitting node.

22. The transmitting apparatus of claim 21, wherein said receiving of scheduling information comprises receiving a scheduling message that defines a plurality of discontinuous protected transmission time intervals.

23. The transmitting apparatus of claim 21, wherein said receiving of scheduling information comprises receiving a plurality of scheduling messages, each of the plurality of scheduling messages corresponding to a single protected transmission time interval following the scheduling message.

24. The transmitting apparatus of claim 23, wherein each protected transmission time interval follows the corresponding scheduling message by a predetermined interval.

25. The transmitting apparatus of claim 15, wherein the radio control unit is adapted to determine the one or more protected transmission time intervals by identifying the one or more protected transmission time intervals according to a rule stored in the first transmitting node.

26. The transmitting apparatus of claim 15, wherein the radio control unit is further adapted to first determine whether one or more mobile terminals are likely within a predetermined range of the first transmitting node, and to control the radio unit to transmit the second data during the one or more protected transmission time intervals in response to determining that at least one mobile terminal is likely within the predetermined range.

27. The transmitting apparatus of claim 15, wherein the radio control unit is adapted to control the radio unit to ramp up a transmit power level during each transmission of the second data, from a reduced power level.

28. The transmitting apparatus of claim 15, wherein the protected transmission time intervals are selected to coincide with control data transmissions from the second transmitting node.

* * * * *